United States Patent [19]

Bueschl et al.

[11] Patent Number: 5,011,871
[45] Date of Patent: Apr. 30, 1991

[54] IMPACT RESISTANT THERMOPLASTIC MOLDING COMPOSITION AND USE THEREOF

[75] Inventors: Rainer Bueschl, Roedersheim-Gronau; Adolf Echte, Ludwigshafen; Konrad Schulte, Schifferstadt; Hans Mittnacht, Weinheim, all of Fed. Rep. of Germany

[73] Assignee: BASF Aktiengesellschaft, Ludwigshafen, Fed. Rep. of Germany

[21] Appl. No.: 323,753

[22] Filed: Mar. 15, 1989

[30] Foreign Application Priority Data

Mar. 31, 1988 [DE] Fed. Rep. of Germany ....... 3811014

[51] Int. Cl.$^5$ .................................................. C08L 51/04
[52] U.S. Cl. ..................... 523/436; 524/287; 524/315; 524/376; 524/530; 524/531; 524/533; 524/535; 525/279; 525/284; 525/286; 525/295; 525/296; 525/303
[58] Field of Search ............... 525/74, 77, 79, 286, 525/296, 303, 279, 284, 295; 524/287, 315, 376, 530, 531, 533, 535; 523/436

[56] References Cited

U.S. PATENT DOCUMENTS

| 4,330,641 | 5/1982 | Echte | 525/296 |
| 4,739,011 | 4/1988 | Kawata | 525/74 |
| 4,886,856 | 12/1989 | Chen | 525/74 |

FOREIGN PATENT DOCUMENTS 3140566 4/1983 Fed. Rep. of Germany ........ 525/74

1353897 5/1974 United Kingdom ............... 525/286

*Primary Examiner*—John C. Bleutge
*Assistant Examiner*—David Buttner
*Attorney, Agent, or Firm*—Oblon, Spivak, McClelland, Maier & Neustadt

[57] ABSTRACT

An impact resistance thermoplastic molding composition contains, each percentage being based on A+B, from 80 to 55% by weight of a hard matrix A of a copolymer containing at least 95% by weight of an aromatic vinyl monomer $a_{11}$ of from 8 to 10 carbon atoms and at least one comonomer $a_{12}$ in a proportion of 0.1 to 5% by weight, based on A, and from 45 to 20% by weight of a soft phase B which, uniformly dispersed in the hard matrix, has an average particle diameter $d_{50}$ (volume average) of from 3.5 to 9 μm and is obtainable by polymerization of the mixture of monomers $a_{11}$ and $a_{12}$ in the presence of an elastomer (rubber) and subsequent isolation of the useful product, wherein the comonomer $a_{12}$ has the general formula I

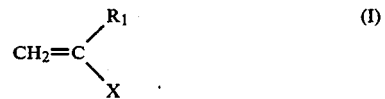

where
X is —OR$^2$, —COOR$^2$ or —CONHR$^3$,
R$^1$ is hydrogen or methyl and
R$^2$ and R$^3$ are each alkyl of from 1 or 2 to 10 carbon atoms with at least one OH or epoxy group or at least one other polar group.

8 Claims, No Drawings

IMPACT RESISTANT THERMOPLASTIC MOLDING COMPOSITION AND USE THEREOF

The present invention relates to an impact resistant and stress cracking resistant thermoplastic molding composition which contains, each percentage being based on A+B, A: from 80 to 55% by weight of a hard matrix of a copolymer containing at least 95% by weight of an aromatic vinyl monomer $a_{11}$ of from 8 to 10 carbon atoms and at least one comonomer $a_{12}$ in a proportion of 0.1 to 5% by weight, based on A, and B: from 45 to 20% by weight of a soft phase which, uniformly dispersed in the hard matrix, has an average particle diameter $d_{50}$ (volume average) of from 3.5 to 9 μm and is obtainable by polymerization of the mixture of monomers $a_{11}$ and $a_{12}$ in the presence of an elastomer (rubber) and subsequent isolation of the useful product.

Prior art references cited:
(1) DE-B-2,525,019
(2) DE-A-3,100,785
(3) DE-A-3,702,037
(4) EP-A1-0,029,174 and
(5) EP-A1-0,250,836.

It is known that inside compartments of refrigerators are made from impact resistant polystyrene of good resistance to stress cracking corrosion. (1) discloses molding compositions which are suitable for this purpose whose hard matrix is exclusively composed of polystyrene.

(2) and (3) likewise disclose stress cracking resistant molding compositions which contain in the hard matrix up to 12% by weight of a comonomer, for example an ethylenically unsaturated nitrile or an acrylic or methacrylic acid derivative. Owing to their stress cracking resistance these molding compositions are likewise suitable for refrigeration apparatus.

(4) describes a process for producing a thermoplastic two-phase molding composition in the presence of an ionic crosslinker where the hard matrix contains an acid as a comonomer.

It is further known that inside compartments of refrigerators are foamed out with polyurethane foam in the course of the assembly of the refrigerator.

The disadvantage of the molding compositions described in (1) is that they do not adhere to PU foam, which is why the latter becomes detached under the action of weak forces. This has an adverse effect on the stability of the construction as a whole.

It is true that the molding compositions described in (2) and (3) show adequate adhesion to polyurethane foam, but the disadvantage here is that the flow behavior of the polymer melt is adversely affected by such large amounts of polar comonomers and as a consequence the processing properties are very poor, so poor as to disqualify these molding compositions from use. It is true that this effect can be opposed by reducing the molecular weight, but it is known to the skilled worker that this in turn normally has an adverse effect on the mechanical properties, such as the impact strength.

(5) teaches that products of good foam adhesion are obtainable by copolymerizing styrene with small proportions of monomers having acidic groups, such as itaconic acid, fumaric acid, acrylic acid or methacrylic acid.

However, it is in the acidic nature of these comonomers that in production equipment not lined with stainless steel they attack the pipework and kettle materials used.

A further disadvantage is that the molding composition described in (2) requires the handling of toxic acrylonitrile.

It is an object of the present invention to provide molding compositions of suitable comonomers that are impact and stress cracking resistant and do not attack customary production equipment.

We have found that this object is achieved with an impact resistant and also stress cracking resistant thermoplastic molding composition which adheres to polyurethane foam and which, based on A+B, contains:

A: from 80 to 55% by weight of a hard matrix of a copolymer containing at least 95% by weight of units of an aromatic vinyl monomer $a_{11}$ of from 8 to 10 carbon atoms and of at least one comonomer $a_{12}$ in a proportion of 0.1 to 5% by weight, based on A, and B: from 45 to 20% by weight of a soft phase which, uniformly dispersed in the hard matrix, has an average particle diameter $d_{50}$ (volume average) of from 3.5 to 9 μm, as obtained by polymerization of the mixture of monomers $a_{11}$ and $a_{12}$ in the presence of an elastomer (rubber) and subsequent isolation of the useful product, wherein the comonomer $a_{12}$ has the general formula I

where
X is $-OR^2$, $-COOR^2$ or $-CONHR^3$,
$R^1$ is hydrogen or methyl and $R^2$ and $R^3$ are each alkyl of 1 or 2 carbon atoms with at least one OH or epoxy group or at least one other polar group.

The molding composition according to the invention has a two-phase structure and contains a hard matrix A and a soft phase B. During or after the production of the molding compositions, customary additives (component C) are added if necessary.

The molding composition contains, based on A+B, preferably from 75 to 55% by weight of A and from 25 to 45% by weight of B.

Based on 100 parts by weight of A+B, from 0.5 to 25, preferably from 1 to 20, parts by weight of C may be present.

COMPONENT A

Component A of the molding composition according to the invention consists of a copolymer of at least one aromatic vinyl monomer $a_{11}$ of from 8 to 10 carbon atoms and at least one comonomer $a_{12}$ in a proportion of from 0.1 to 5% by weight, based on A.

Based on A, for example from 95 to 99.90% by weight of the aromatic vinyl monomer $a_{11}$ and from 0.10 to 5% by weight of the comonomer $a_{12}$ are present in the hard matrix copolymer as copolymerized units. The preferred proportion of $a_{12}$ is from 0.2 to 2% by weight.

The viscosity number of the hard matrix should be from 60 to 90 ml/g (0.5% strength solution in toluene at 23° C.), in particular from 65 to 80 ml/g.

Suitable aromatic monovinyl monomers $a_{11}$ of from 8 to 10 carbon atoms are in particular styrene and also the ring or side chain alkylated styrenes, such as α-methylstyrene and p-methylstyrene. Preferably, however, styrene is used exclusively.

The comonomers $a_{12}$ used differ from the monomers $a_{11}$ and are those made of monomers of the general formula $H_2C=CR^1X$ (I) where X is $-OR^2$, $-COOR^2$ or $-CONHR^3$, $R^1$ is hydrogen or methyl and $R^2$ and $R^3$ are each alkyl of 1 or 2 carbon atoms with at least one OH or epoxy group or at least one other polar group.

The preferred comonomers are acrylamide, methacrylamide, N-methacrylamide and N-methylmethacrylamide.

It is also possible to use N-substituted acrylamides or methacrylamides that contain in their organic radical further polar groups, such as p-hydroxymethacrylanilide or N-(3-hydroxy-2,2'-dimethylpropyl)methacrylamide.

Preferred examples of comonomers $a_{12}$ to be used are the hydroxyalkyl species, hydroxyethyl acrylate, hydroxyethyl methacrylate, hydroxypropyl acrylate or methacrylate and butanediol monoacrylate or monomethacrylate.

It is also possible to use other acrylates or methacrylates having polar groups in the alcohol component of the ester, such as 2-cyanoethyl acrylate, 2furfuryl acrylate, 2-N-morpholinoethyl acrylate or the corresponding methacrylates.

These monomers are preferably selected from the group consisting of the hydroxyalkyl acrylates, the hydroxyalkyl methacrylates and mixtures thereof, preference being given in particular to the ethyl and propyl derivatives.

Preferred examples of comonomers having an epoxy group in the molecule are glycidyl acrylate and glycidyl methacrylate.

COMPONENT B

Component B of the molding composition according to the invention is a soft phase which is present in fine dispersion in the hard matrix. The soft phase can be seen in electron micrographs of the end product, i.e. the molding composition. The proportion of the soft phase is determined by measuring the gel content. The soft phase is a graft copolymer of monomers $a_{11}$ and $a_{12}$ of the hard matrix (i.e. a copolymer) on an elastomer (rubber) as grafting base. The preparation and dispersion are known to those skilled in the art.

The elastomer or rubber used is a natural or synthetic rubber customarily used for the impact strength modification of styrene polymers. Suitability for the purposes of the invention is possessed by polybutadiene, polyisoprene and copolymers of butadiene and/or of isoprene with styrene that have a glass transition temperature below −20° C. The copolymers of butadiene or of isoprene with styrene may contain the monomers not only in random distribution but also in block form. Particular preference is given to polybutadiene containing from 30 to 99% of cis-1,4 units.

In the preparation of the soft phase, the elastomer is employed in a proportion of, for example, from 4 to 12% by weight, preferably of from 6 to 12% by weight, based on the mixture of monomers $a_{11}+a_{12}$; if necessary, a solvent and assistants such as regulants, lubricants, etc. are used as well.

The average molecular weight of the elastomers is within the range from 50,000 to 400,000, in particular from 200,000 to 300,000 (weight average). The particles of the soft phase consist of cell particles which have an average particle diameter, $d_{50}$ value (volume average from image analysis), of from 3.5 to 9 μm, preferably from 4 to 6 μm, combined with a distribution width, the ($d_{90}$-$d_{10}$) value, of from 4 to 10 μm. The grafted copolymer of $a_{11}$ and $a_{12}$ occluded in the soft phase is counted as part of the latter.

COMPONENT C

In addition to A+B, the molding composition according to the invention may contain additives. This component C may be present from the start in the production of the molding composition or else be mixed when the molding composition is to be processed.

Typical assistants for the production of the molding composition are mineral oil, esters of aromatic or aliphatic carboxylic acids with aliphatic alcohols, polyalkylene oxides based on ethylene oxide and/or propylene oxide, molecular weight regulants, protective colloids, antioxidants and the like. Useful assistants also include lubricants, such as zinc stearate and other stearates, dyes, stabilizers and flameproofing agents in the customary amounts.

The molding composition according to the invention should have the following properties, some of which can be varied by the choice of the hard matrix, some by the choice of the soft phase or manner of preparation and all of which should be ascertained from case to case in a simple preliminary test:

1. The swelling index of the soft phase should be within the range from 9 to 13.
2. The gel content should be within the range from 25 to 35.
3. The viscosity number (VN) of the hard matrix should be from 60 to 90 [ml/g].
4. The average particle diameter, the $d_{50}$ value (volume average by image analysis), should be within the range from 3.5 to 9 μm, preferably from 4 to 6 μm, coupled with a $d_{90}$-$d_{10}$ value within the range from 4 to 10 μm.
5. The impact strength should be from 5 to 25 [Nm].
6. The breaking strength should be from 5 to 15% above the corresponding yield limit.

Methods for determining parameters 1 to 6 are also described in publications (1) to (4), if not indicated here in detail.

PREPARATION OF THE MOLDING COMPOSITION ACCORDING TO THE INVENTION

The molding compositions according to the invention are prepared by polymerizing the monomer mixture $a_{11}$ and $a_{12}$ in the presence of the rubber, the rubber initially being dissolved in the monomer mixture and this starting solution then being polymerized with stirring. Such a polymerization is referred to as a mass polymerization; copolymers A and graft copolymers B are formed at the same time.

The batch may be admixed with up to 50% by weight, based on the monomer mixture, of a solvent. Examples of suitable solvents for this purpose are aromatic hydrocarbons such as toluene, ethylbenzene and the xylenes. Such a polymerization is referred to as a solution polymerization.

The molding composition according to the invention may also be obtained by initial polymerization in the mass and then in aqueous suspension. To this end, the solution of the rubber is prepolymerized in the monomers with stirring up to a conversion of about 35% in the mass, then suspended in water and thereafter polymerized to completion.

In all three embodiments, the polymerization in general takes place at from 50 to 250°, preferably at from 80 to 200° C. The polymerization may be initiated either thermally or by adding customary oil-soluble free radical initiators, such as peroxides or azo compounds.

The polymerization may be carried out continuously or batchwise.

The continuous process is described in sufficient detail in DE-B-1,770,392 and the batchwise process in DE-B-2,613,352.

When the mass has fully polymerized, the result is a hard matrix of the copolymer with a soft phase embedded therein.

The soft phase (gel content) is the proportion of impact modified polymer that is soluble in toluene at room temperature (23° C.), minus any pigments. This soft phase has a heterogeneous structure and is formed during the process of preparation. Its amount and degree of division is determined by the process conditions.

The rubber solution to be polymerized, as we know, separates into two phases once the polymerization is underway, of which the solution of the rubber in the monomer mixture initially forms the coherent phase, while the second phase, a solution of the copolymer in the monomers, remains suspended in droplet form in the first phase. As the conversion rises, the amount of the second phase increases at the expense of the first phase with monomers being consumed; and there is a change in the phase coherence with droplets of the rubber solution forming in the copolymer solution thatnsumed; and then smaller droplets of the then-external phase in firm occlusion.

This process is accompanied by a grafting reaction where chemical bonds form between the rubber molecules and the copolymer to form graft copolymers of the two constituents. This process is known and described for example in detail in Fischer, Angew. Makromol. Chem. (1973), 35-74.

The parameters described in the examples and comparisons were determined as follows:

1. The viscosity number VN of the hard matrix in ml/g is determined in accordance with German Standard Specification DIN 53 724 (0.5% strength solution in toluene at 23° C).
2. The impact strength is measured in terms of the 50% damaging energy $W_{50}$ [N.m] as determined in a falling bolt test as described in German Standard Specification DIN 53 443 at T=23° C. on test boxes injection molded at T=280° C.
3. Thin section electron micrographs were prepared in a conventional manner of the products of the examples and comparisons to determine the particle size and the dispersion of the soft phase.

The method used was image analysis as described by W. Alex in Zeitschrift für Aufbereitung und Verfahrenstechnik 13 (1972) in section 3.11. The number of analyzed particles was between 1500 and 6500.

The reported average particle size is in all cases the volume average particle size. Image analysis provides the cumulative volume distribution of the particle diameter of the sample. The cumulative volume distribution reveals what volume percentage of the particles has a diameter equal to or below a certain size. The average particle diameter, which is also referred to as the $d_{50}$ value of the cumulative volume distribution, is defined as that particle diameter at which 50% by volume of the particles have a larger diameter than corresponds to the $d_{50}$ value. The size distribution of the rubber particles is characterized not only with the $d_{50}$ value (average particle diameter) but also in terms of the $d_{10}$ and $d_{90}$ values which likewise result from the cumulative volume distribution. The $d_{10}$ and $d_{90}$ values of the cumulative volume distribution are defined in the same way as the $d_{50}$ value except that they relate respectively to 10 and 90% by volume of the particles.

4. To measure the resistance to stress cracking corrosion under the influence of fats, standard small bars molded in accordance with German Standard Specification DIN 53 449 were stored at 23° C. in a test medium of 1:1 olive oil/oleic acid for 23 hours. Thereafter the elongation at break (%) is determined in a tensile test as a function of the ball oversize. For comparison, standard small bars left in air for 24 hours were tested. The stress cracking resistance is reported in terms of the relative and the absolute residual elongation at break. The relative residual elongation at break is defined as $$\text{relative residual elongation at break} = \frac{\text{elongation at break (olive oil/oleic acid)}}{\text{elongation at break (air)}} \cdot 100[\%]$$

and the reported values are each averages of measurements at three different ball oversizes of about 100, 150 and 200 μm.

Those products are classed as stress cracking resistant for the purposes of the present invention which have relative residual elongation at break of more than 30% and an absolute residual elongation at break of more than 10%.

The resistance to stress cracking corrosion following exposure to low-boiling halohydrocarbons was tested as described above following one hour's storage of molded standard small bars in a Frigen-11 atmosphere. Here products are classified as stress cracking resistant for the purposes of the present invention if they have a relative residual elongation at break of more than 75% and an absolute residual elongation at break of more than 10%.

5. The adhesion to polyurethane foams was measured by placing molded round disks 6 cm in diameter on a support and pouring a commercial foaming polyurethane mixture (spray can) over them. After 24 hours the molded platelets were manually peeled away from the foam. They are rated as showing good foam adhesion if the foam breaks on separation and as showing poor foam adhesion if separation takes place at the boundary between impact resistant polystyrene/polyurethane foam.
6. The flowability was measured in terms of the melt flow index at 200° C. under a load of 5 kp in [g/10 min] (German Standard Specification DIN 53 735).

To carry out the examples and comparisons, the rubber (elastomeric grafting base) used was a commercial product, ®Buna HX 529 C from Bayer AG, which according to the manufacturer is a homopolybutadiene having a weight average molecular weight of 295,000 and a cis unit content of 37%.

In the examples and comparisons below, the reported amounts are by weight, unless otherwise stated.

EXAMPLES 1 TO 5 AND COMPARATIVE EXAMPLES I AND II

EXAMPLE I

A 5-liter capacity kettle equipped with a horseshoe stirrer is charged with 1736 g of styrene, 152 g of polybutadiene (Buna HX 529 C), methacrylamide, 1.9 g of a sterically hindered phenol as a stabilizer (®Irganox from Ciba-Geigy), and 0.95 g of t-dodecylmercaptan. Dissolution of all the polybutadiene is followed at 75 stirrer revolutions per minute by isothermal polymerization at 123° C. up to a conversion of 35%, based on the monomers. The polymerization is then continued in aqueous suspension. To this end, 1.9 g of dicumyl peroxide are added, followed by 1800 ml of $H_2O$, 18 g of a suspension aid based on ethylene oxide (®Luviskol K90 from BASF Aktiengesellschaft) and 1.8 g of sodium pyrophosphate. In the suspension, the polymerization is carried on at 300 stirrer revolutions per minute under isothermal conditions at 130° C for 6 hours and again under isothermal conditions at 140° C for a further 6 hours until the conversion is more than 99%, based on the monomers.

The methacryloyl content in the end product was determined by elemental analysis. A value of 0.48% by weight, based on the molding composition composed of hard matrix and soft phase, was found. The VN of the hard matrix are found to be 71.1. The $d_{50}$ value was 5.5 μm and the $d_{90}-d_{10}$ value 6.3 μm.

EXAMPLES 2 TO 5 AND COMPARATIVE EXAMPLES I AND II

Examples 2 to 5 and Comparative Examples I (without comonomer) and II were carried out in the abovedescribed experimental apparatus, with the proviso that the amount of comonomer was varied, giving the contents in the end product, based on A+B, mentioned in Table 1. Table 1 also includes the viscosity numbers of the matrix, the proportion of soft phase (gel content), the average particle diameter ($d_{50}$) and the particle distribution parameter ($d_{90}-d_{10}$)

TABLE 1

| | Comonomer | | Soft phase (%) | VN (ml/g) | $d_{50}$ | $d_{90}-d_{10}$ |
|---|---|---|---|---|---|---|
| | Type | Amount | | | | |
| Example | | | | | | |
| 1 | Methacrylamide | 0.5 | 32.9 | 72.9 | 6.2 | 7.2 |
| 2 | Acrylamide | 0.5 | 33.2 | 72.5 | 6.5 | 7.3 |
| 3 | N-Methyl-methacrylamide | 0.5 | 33.2 | 72.0 | 6.5 | 6.9 |
| 4 | Methacrylamide | 0.1 | 31.9 | 72.8 | 5.9 | 6.8 |
| 5 | Methacrylamide | 1.95 | 32.5 | 73.0 | 6.0 | 7.1 |
| Comparatives | | | | | | |
| I | — | | 33.5 | 72.0 | 6.7 | 7.3 |
| II | N-Methyl-methacrylamide | 0.01 | 33.5 | 71.9 | 6.8 | 7.1 |

On comparing the properties in Example 2 it can be seen that the molding composition according to Example 1 of the invention shows impressive stress cracking resistance. It can also be seen that the polymer of Example 1 gives good adhesion to PU foam and that its flowability has not deteriorated.

In the case of the products of Examples 2 to 5, the result is a combination of stress cracking resistance and good foam adhesion.

By contrast, the samples of Comparative Examples I and II show no foam adhesion, for which the complete absence (test I) or a very low level (test II) of monomer $a_{12}$ is responsible.

TABLE 2

| | Stress cracking corrosion (residual elongation at break) | | | | PU foam adhesion | MFI (g/10') |
|---|---|---|---|---|---|---|
| | olive oil/oleic acid | | Frigen | | | |
| | absolute | relative | absolute | relative | | |
| Example | | | | | | |
| 1 | 18 | 41 | 41 | 92 | good | 4.8 |
| 2 | 20 | 42 | 45 | 93 | good | 4.7 |
| 3 | 20 | 43 | 44 | 93 | good | 4.5 |
| 4 | 18 | 41 | 39 | 91 | good | 4.9 |
| 5 | 17 | 39 | 39 | 90 | good | 4.8 |
| Comparatives | | | | | | |
| I | 18 | 37 | 44 | 90 | poor | 4.8 |
| II | 16 | 35 | 42 | 91 | poor | 4.6 |

EXAMPLES 6 TO 9 AND COMPARATIVE EXAMPLES III AND IV

EXAMPLE 6

A 5-liter capacity kettle equipped with a horseshoe stirrer is charged with 1736 g of styrene, 152 g of polybutadiene (Buna HX 529 C), 9.5 g of glycidyl methacrylate, 1.9 g of a sterically hindered phenol as a stablizer (®Irganox 1076 from Ciba-Geigy), and 0.95 g of t-dodecylmercaptan. Dissolution of all the polybutadiene is followed at 75 stirrer revolutions per minute by isothermal polymerization at 123° C. up to a conversion of 35%, based on the monomers. The polymerization is then continued in aqueous suspension. To this end, 1.9 g of dicumyl peroxide are added, followed by 1800 ml of $H_2O$, 18 g of a suspension aid based on ethylene oxide (®Luviskol K90 from BASF Aktiengesellschaft) and 1.8 g of sodium pyrophosphate. In the suspension, the polymerization is carried on at 300 stirrer revolutions per minute under isothermal conditions at 130° C. for 6 hours and again under isothermal conditions at 140° C. for a further 6 hours until the conversion is more than 99%, based on the monomers.

The comonomer content in the end product was determined by elemental analysis. A value of 0.49% by weight, based on the molding composition composed of hard matrix and soft phase, was found. The VN of the hard matrix was found to be 72.5. The $d_{50}$ value was 5.8 μm and the $d_{90}-d_{10}$ value 6.3 μm.

Examples 7 to 9 and Comparative Examples II (without comonomer) and IV were carried out in the abovedescribed experimental apparatus, with the proviso that the amount of comonomer was varied, giving the contents in the end product, based on A+B, mentioned in Table 3. Table 3 also shows the viscosity numbers of the matrix, the soft phase or gel content, average particle diameter ($d_{50}$) and the particle size distribution paramter ($d_{90}-d_{10}$).

TABLE 3

| | Comonomer | | Soft phase (%) | VN (ml/g) | $d_{50}$ (μm) | $d_{90}-d_{10}$ (μm) |
|---|---|---|---|---|---|---|
| | Type | Amount (%) | | | | |
| Example | | | | | | |

TABLE 3-continued

| | Comonomer | | Soft | | | |
|---|---|---|---|---|---|---|
| | Type | Amount (%) | phase (%) | VN (ml/g) | $d_{50}$ ($\mu$m) | $d_{90}$-$d_{10}$ ($\mu$m) |
| 7 | Glycidyl methacrylate | 1.95 | 31.5 | 70.1 | 5.9 | 6.9 |
| 8 | Glycidyl methacrylate | 0.1 | 32.1 | 72.4 | 6.9 | 7.2 |
| 9 | Glycidyl methacrylate | 0.01 | 33.7 | 72.2 | 6.8 | 7.6 |
| Comparatives | | | | | | |
| III | — | — | 33.5 | 72.0 | 6.7 | 7.3 |
| IV | Glycidyl methacrylate | 0.01 | 33.1 | 71.6 | 6.6 | 7.3 |

On comparing the properties in Example 4 it can be seen that the molding composition according to Example 1 of the invention shows impressive stress cracking resistance. It can also be seen that the polymer of Example 6 shows good adhesion to PU foam and that its flowability has not deteriorated.

In the case of the products of Examples 7, 8 and 9, the result is a combination of stress cracking resistance and good foam adhesion.

By contrast, the samples of Comparative Examples III and IV show no foam adhesion, for which a complete lack (test III) or a very low level (test IV) of monomer $a_{12}$ is responsible.

TABLE 4

| | Stress cracking corrosion (residual elongation at break) | | | | | |
|---|---|---|---|---|---|---|
| | olive oil/ oleic acid | | Frigen | | PU | |
| | absolute | relative | absolute | relative | foam adhesion | MFI (g/10') |
| Example | | | | | | |
| 6 | 16 | 39 | 41 | 45 | good | 4.3 |
| 7 | 19 | 44 | 40 | 43 | good | 4.3 |
| 8 | 18 | 38 | 43 | 48 | good | 4.3 |
| 9 | 20 | 40 | 45 | 49 | good | 4.2 |
| Comparatives | | | | | | |
| III | 18 | 37 | 44 | | poor | 4.3 |
| IV | 19 | 41 | 44 | 47 | poor | 4.5 |

EXAMPLES 10 TO 15 AND COMPARATIVE EXAMPLES V AND VI

EXAMPLE 10

A 5-liter capacity kettle equipped with a horseshoe stirrer is charged with 1736 g of styrene, 152 g of polybutadiene (Buna HX 529 C), 9.5 g of hydroxyethyl methacrylate, 1.9 g of a sterically hindered phenol as a stabilizer (®Irganox 1076 from Ciba-Geigy), and 0.95 g of t-dodecylmercaptan. Dissolution of all the polybutadiene is followed at 75 stirrer revolutions per minute by isothermal polymerization at 123° C. up to a conversion of 35%, based on the monomers. The polymerization is then continued in aqueous suspension. To this end, 1.9 g of dicumyl peroxide are added, followed by 1800 ml of H$_2$O, 18 g of a suspension aid based on ethylene oxide (®Luviskol K90 from BASF Aktiengesellschaft) and 1.8 g of sodium pyrophosphate. In the suspension, the polymerization is carried on at 300 stirrer revolutions per minute under isothermal conditions at 130° C. for 6 hours and again under isothermal conditions at 140° C. for a further 6 hours until the conversion is more than 99%, based on the monomers.

The comonomer content in the end product was determined by elemental analysis. A value of 0.47% by weight, based on the molding composition composed of hard matrix and soft phase, was found. The VN of the hard matrix was found to be 72.5. The $d_{50}$ value was 5.1 $\mu$m and the $d_{90}$-$d_{10}$ value 6.2 $\mu$m.

EXAMPLES 11 TO 15 AND COMPARATIVE EXAMPLES V AND VI

Examples 11 to 16 and Comparative Examples V (without comonomer) and VI were carried out in the abovedescribed experimental apparatus, with the proviso that the amount of comonomer was varied, giving the contents in the end product, based on A+B, mentioned in Table 5. Table 5 also includes the viscosity numbers of the matrix, the soft phase or gel content, the average particle diameter ($d_{50}$) and the particle size distribution parameter ($d_{90}$-$d_{10}$).

TABLE 5

| | Comonomer | | Soft | | | |
|---|---|---|---|---|---|---|
| | Type | Amount (%) | phase (%) | VN (ml/g) | $d_{50}$ | $d_{90}$-$d_{10}$ |
| Example | | | | | | |
| 11 | HPMA[1] | 0.5 | 33.3 | 72.5 | 6.1 | 7.3 |
| 12 | HPA[2] | 0.5 | 31.5 | 71.8 | 5.9 | 7.3 |
| 13 | HEA[3] | 0.5 | 31.9 | 72.2 | 5.7 | 6.8 |
| 14 | HEMA[4] | 0.1 | 33.4 | 70.9 | 6.6 | 7.7 |
| 15 | HEMA | 1.95 | 31.1 | 68.9 | 5.8 | 6.9 |
| Comparatives | | | | | | |
| V | — | — | 33.5 | 72.0 | 6.7 | 7.3 |
| VI | HEMA | 0.01 | 33.3 | 71.5 | 6.4 | 7.1 |

[1]HPMA—hydroxypropyl methacrylate
[2]HPA—hydroxypropyl acrylate
[3]HEA—hydroxyethyl acrylate
[4]HEMA—hydroxyethyl methacrylate On comparing the properties in Example 6 it can be seen that the molding composition of Example 1 according to the invention shows impressive stress cracking resistance. It can also be seen that the polymer of Example 1 shows good adhesion to PU foam and that its flowability has not deteriorated.

In the case of the products of Examples 11 to 15, the result is a combination of stress cracking resistance and good foam adhesion.

By contrast, the samples of Comparative Examples V and VI show no foam adhesion, for which a complete lack (test V) or a very low level (test VI) of monomer $a_{12}$ is responsible.

TABLE 6

| | Stress cracking corrosion (residual elongation at break) | | | | | |
|---|---|---|---|---|---|---|
| | olive oil/oleic acid | | Frigen | | PU | |
| | absolute | relative | absolute | relative | foam adhesion | MFI (g/10') |
| Example | | | | | | |
| 10 | 18 | 39 | 41 | 90 | good | 4.1 |
| 11 | 20 | 41 | 45 | 93 | good | 4.6 |
| 12 | 19 | 42 | 41 | 91 | good | 4.2 |
| 13 | 20 | 42 | 44 | 92 | good | 4.2 |
| 14 | 19 | 39 | 43 | 88 | good | 4.8 |
| 15 | 18 | 43 | 40 | 94 | good | 3.7 |
| Comparatives | | | | | | |
| V | 18 | 37 | 44 | 90 | poor | 4.8 |
| VI | 18 | 38 | 41 | 88 | poor | 4.7 |

We claim:

1. An impact resistant thermoplastic molding composition containing, each percentage being based on A+B, A: from 80 to 55% by weight of a hard matrix of a copolymer containing at lest 95% by weight of units of aromatic vinyl monomer $a_{11}$ of from 8 to 10 carbon atoms and of at least one comonomer $a_{12}$ of a proportion of 0.1 to 1.95% by weight, based on A, and B: from 45 to 20% by weight of a soft phase which, uniformly dispersed in the hard matrix, has an average particle diameter $d_{50}$ (volume average) of from 3.5 to 9 μm, as obtained by solution polymerization, mass polymerization or initial mass polymerization followed by aqueous dispersion polymerization of the mixture of monomers $a_{11}$ and $a_{12}$ in the presence of elastomer (rubber) and subsequent isolation of the useful product, wherein the comonomer $a_{12}$ has the general Formula I

where
X is $-OR^2$ or $-COOR^2$,
$R^1$ is hydrogen or methyl and
$R^2$ is substituted alkyl of from 1 or 2 to 10 carbon atoms with at least one OH, epoxy, cyano, furfuryl or morpholino group or wherein $a_{12}$ is selected from the group consisting of acrylamide, methacrylamide, N-methylacrylamide, and N-methylmethacrylamide.

2. A molding composition as claimed in claim 1, wherein the comonomer is acrylamide, methacrylamide, N-methylacrylamide, N-methylmethacrylamide or a mixture thereof.

3. A molding composition as claimed in claim 1, wherein the comonomer is a hydroxyalkyl acrylate or a hydroxyalkyl methacrylate.

4. A molding composition as claimed in claim 3, wherein the monomer is hydroxyethyl or hydroxypropyl (meth)acrylate.

5. A molding composition as claimed in claim 1, wherein the comonomer is glycidyl acrylate or glycidyl methacrylate.

6. A molding composition as claimed in claim 1, containing
from 75 to 55% by weight of the hard matrix A and
from 45 to 25% by weight of the soft phase B.

7. A molding composition as claimed in claim 1, as obtained by polymerization of the mixture of the monomers $a_{11}$ and $a_{12}$ in the presence of from 6 to 12% by weight, based on $a_{11}$ and $_{12}$, of polybutadiene.

8. A molding composition as claimed in claim 1, also containing an additive C selected from the group consisting of mineral oil, esters of aromatic or aliphatic carboxyl acids with aliphatic alcohols, polyalkylene oxides based on ethylene oxide, propolyene oxide or mixtures thereof, molecular weight regulants, protective colloids, anti oxidants, lubricants, dyes, stabilizers and flameproofing agents.

* * * * *